Patented Sept. 30, 1924.

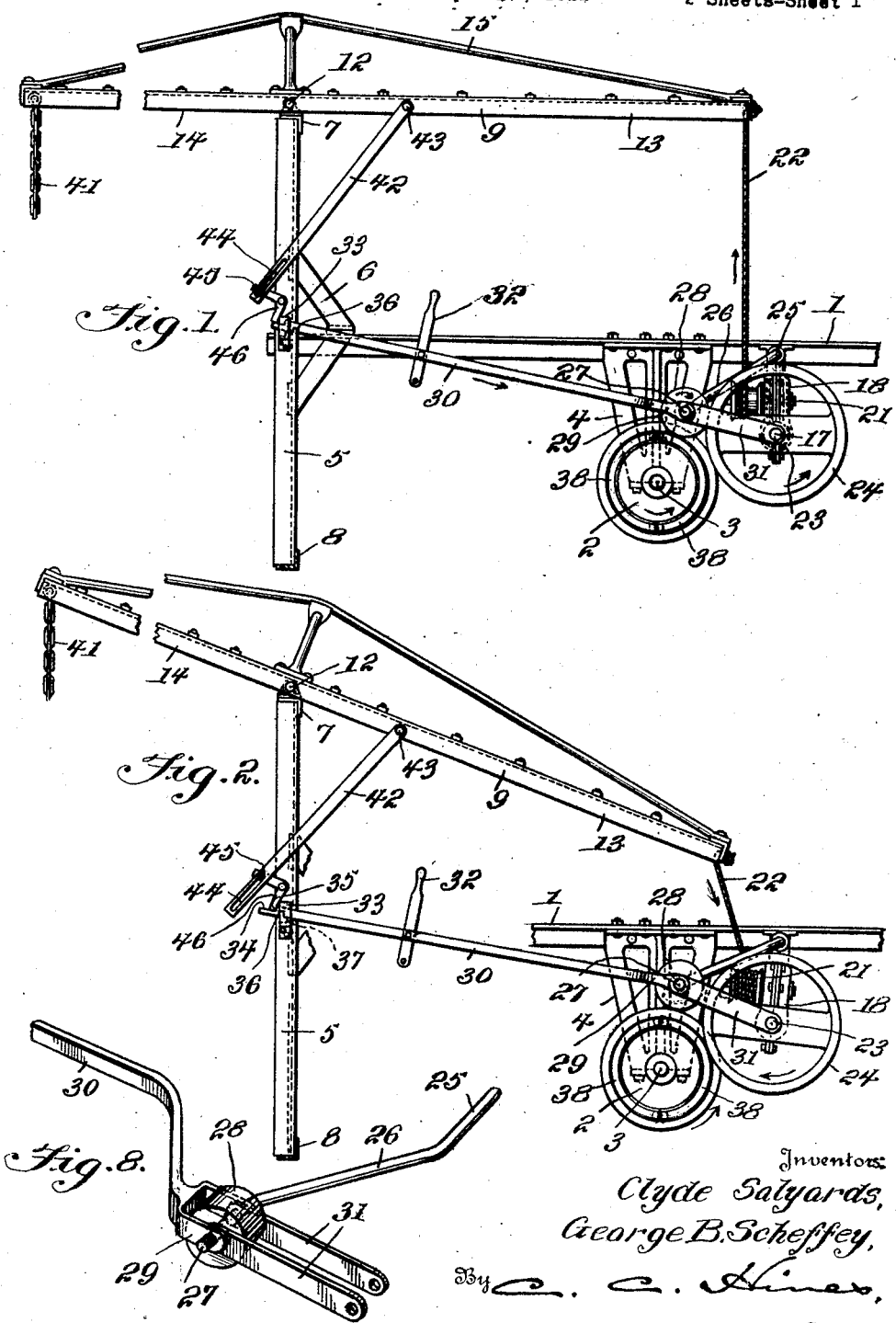

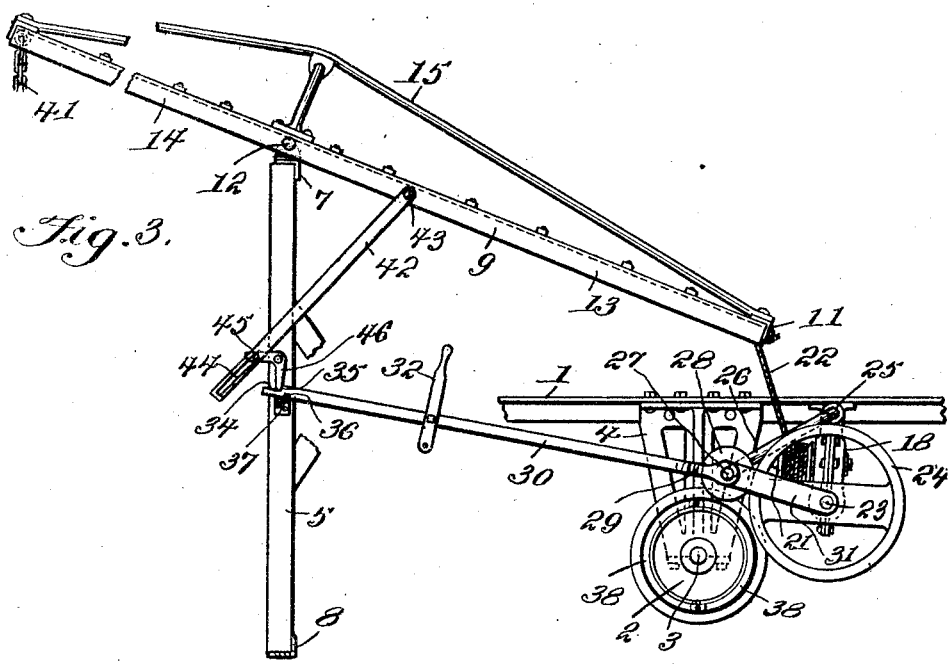

1,509,905

UNITED STATES PATENT OFFICE.

CLYDE SALYARDS AND GEORGE B. SCHEFFEY, OF HAXTUM, COLORADO.

LIFTING ATTACHMENT FOR TRACTORS.

Application filed September 27, 1922. Serial No. 590,844.

*To all whom it may concern:*

Be it known that we, CLYDE SALYARDS and GEORGE B. SCHEFFEY, citizens of the United States, residing at Haxtum, in the county of Phillips and State of Colorado, have invented new and useful Improvements in Lifting Attachments for Tractors, of which the following is a specification.

This invention relates to a lifting attachment for tractors, and has special reference to the provision of lifting means at the rear of a tractor whereby plows or other implements may be lifted in a convenient manner and without imposing excess strain on the engine, and whereby loads of any kind may be hoisted for transportation by means of the tractor or other vehicle or for other purposes where loads are to be handled or lifted in farming or other work where a tractor is used for power or transportation purposes.

The object of the invention is to provide a lifting device which may be applied to any ordinary make of tractor, which is simple and inexpensive of construction and reliable and efficient in action, and which can be conveniently operated by one man and to a certain extent is automatic in action to govern its operation.

The invention consists of the features of construction, combination and arrangement of parts, hereinafter fully described and claimed, reference being had to the accompanying drawings, in which:—

Figure 1 is a side elevation of the rear portion of a tractor frame, showing the lifting device applied thereto, the friction gearing appearing in unwinding or lowering position.

Figure 2 is a similar view showing the friction gearing in winding or raising position.

Figure 3 is a similar view showing the friction gearing at the limit of a hoisting movement and in neutral position.

Figure 4 is a sectional rear end elevation of the parts illustrated in Figures 1, 2 and 3.

Figure 5 is a detail view of the friction drive pulley and its supporting bracket.

Figure 6 is a side elevation of the friction drive pulley and friction band members separated therefrom.

Figure 7 is a plan view of the friction drive pulley showing the friction band members in partly applied or removed position.

Figure 8 is a perspective view of the intermediate friction wheel, shifter bar and parts associated therewith.

Figure 9 is a detail section on the line 9—9 of Figure 4.

Referring now more particularly to the drawings, the numeral 1 designates the rear ends of the frame bars of a tractor or similar vehicle provided with a suitably driven drive wheel or pulley 2 for transmitting power from the tractor engine. This pulley as shown in the present instance is mounted upon a shaft 3, which may be suitably driven from the engine, said shaft being transversely arranged and journaled in a bracket 4 secured to one of the frame bars 1.

Suitably secured to the frame bars 1 are upright bars 5, extending above and below said bars 1, and forming the main supporting frame elements of a part of the lifting or hoisting device, said bars 5 being suitably reinforced from the frame bars 1, as by braces 6. These bars 5 are united at their upper and lower ends by cross bars 7 and 8, and pivotally mounted upon the upper cross bar 7 is a lifting beam 9 of the walking-beam type. As shown, the beam 9 comprises a pair of spaced longitudinal bars 10 connected at their ends by cross bars 11, said beam being pivotally mounted upon the upright frame bars 5, as indicated at 12 and projecting forwardly and rearwardly beyond the vertical plane of the bars 5 to provide a power arm portion 13 and a load arm portion 14. The beam arms are connected and reinforced on each side of its longitudinal center by girders or trusses 15 of suitable construction which adapt the beam to be made of metal bars which are light in weight while providing a beam of great strength to withstand the strains falling thereon. In practice canvas or other suitable material may be stretched between the girder members 15 to form a canopy or cover to shelter the working parts of the device, as well as the workmen, from sun and rain.

Hinged to the frame bars 1 are depending brackets 16 to which are journaled the ends of a transversely disposed power transmitting shaft 17, the ends of which project into gear housings 18 carried by said brackets. On the ends of the shaft within the respective housings are worms 19 meshing with worm gears 20 on longitudinally disposed shafts 21, one at each side of the main frame. The rear ends of these shafts project longitudinally beyond the housings and carry winding drums or pulleys 21, each of which is connected with power arm 13 of the beam 9 by a rod or cable 22.

The bracket 16, coupled by the shaft 17, forms a forwardly and rearwardly swinging frame in which the gear elements above-described are mounted. One end of the shaft 17 extends beyond the swinging frame at one side of the vehicle frame, as indicated at 23 and has fixed thereon a friction wheel 24. A rod 25 is journaled at one end upon the frame beam 9 at such side of the vehicle frame and extends outwardly therefrom and is bent at an angle to form a throw crank 26, the opposite end of said arm projecting laterally from the crank and forming a connecting arm or pin 27. Said part 27 also forms a journal for a friction wheel or roller 28 arranged on a line between the drive pulley 2 and the friction wheel 24 and adjustable relatively thereto to secure certain drum driving actions hereinafter described. The pin or arm 27 passes through fork arms 29 upon the forward end of a shifter bar 30, and said arm 27 also passes through the apertured rear end of a pair of plates 31 forming a link connection between the throw crank and the extended end 23 of the power transmitting shaft 17, the forward ends of said plates 31 being apertured and pivotally engaging the shaft end 23 on opposite sides of the friction gear 24. The shifter bar 30 is disposed longitudinally at one side of the main frame 1 and is provided with a handle 32 of suitable type whereby said bar may be manually moved forwardly or rearwardly for adjusting the friction wheels 24 and 28 relative to each other and to the drive pulley 2 for transmitting power to rotate the drums 21 for winding or unwinding the cables 22 or to dispose the friction wheels in a neutral or non-driving position.

The bar 30 passes at its outer or rear end through a guide member 33, disposed upon one of the uprights 5, and is slidably mounted therein. The extremity of said rear end of the bar 30 is reduced to form a supporting finger 34 and a shoulder 35, and adjacent to and in advance of said shoulder the bar is formed in its underside with a notch or recess 36, said notch or recess being adapted for engagement with a locking flange or projection 37 on the guide 33. The bar 30 is supported and maintained in a proper working position by the guide 33 and its recess 36 is adapted to be engaged with the locking member 37 of said guide to hold said bar against shifting movement in a position in which it maintains the friction drive wheels 24 and 28 in neutral position.

The drive pulleys 2 of tractors are generally of V form in cross section to facilitate the engagement with and disengagement from the same of a drive belt and at its inner side is provided with a flange to hold the belt in position and against the adjacent inclined peripheral surface. To adapt such drive wheel to be employed as a friction drive wheel I provide the same with a friction surface in the form of a friction band composed of a pair of semi-circular band members 38 having interfitting tongued and grooved end portions united by fastening pins or rivets 39. These segments are adapted to be slipped in position upon the V-shaped periphery of the pulley and are internally shaped to fit the same and prevent their displacement, the outer surfaces of said segments being, however, shaped to provide a circular peripheral driving surface which is transversely straight and may be provided with a friction band or covering 40 for proper frictional engagement with the friction wheels 24 and 28 and to reduce or prevent slippage.

In practice, any suitable means may be arranged at the forward end of the lifting arm 14 of the beam 9 for engagement with the load to be lifted. In the present instance a hoisting chain 41 is disclosed to which may be secured hooks or grapples or other means for engagement with the load, or a chain of any suitable length may be provided which may be properly fastened to the load. Figure 1 shows the beam 9 in a substantially horizontal position, in which the cables 22 are unwound to a large extent from the drums 21, thus lowering the hoisting means 41 for use. In this position of the parts the bar 30 is shown shifted forwardly to move the friction wheel 24 out of engagement with the drive wheel 2 and to bring the friction wheel 28 between and into engagement with both the drive wheel and the wheel 24, whereby in the driving action of the parts the wheel 24 will be turned in a counter-clockwise direction for an unwinding motion of the drums 21. In such position of the parts it will be observed that the notched portion 36 of the bar 30 lies in advance of the locking element 37 of the guide 33. By shifting the bar 30 rearwardly, as shown in Figure 2, until the notch 36 passes rearwardly beyond the locking projection 37, the swinging gear frame will be moved rearwardly to shift the friction wheel 28 out of engagement with the friction wheel 2 and to bring the friction wheel 24 into direct engagement with said wheel 2, whereby the gearing will be arranged to drive the wheel 24 in a clockwise direction for a winding action of the drums 21. In the winding of the cables 22 on the drums 21, the power arm 13 of the lever 9 will be drawn downward and the lifting arm 14 of said lever drawn upward, whereby the load will be elevated. By shifting the bar 30 so that the notch 36 therein engages the locking projection 37 the swinging gear frame will be shifted to dispose the friction wheels in the position shown in Figure 3, in which both wheels 24 and 28 are out of driving engagement with the wheel 2 and the parts are locked in such position. It will be observed that the adjustments described are simple in character and may be easily and conveniently carried out and that, by the use of the worm gearing, the hoisting mechanism will be automatically locked at all times in any positions of adjustment, whereby the weight of the load will be sustained at any point even in the event of slippage through improper contact of the acting friction wheel, thus avoiding liability of accidents from casual dropping of the load liable to happen under such conditions where no positive locking means of the character described is provided.

In order to secure an automatic disengagement of the friction wheel 24 from the friction drive wheel 2 during a winding action, so as to prevent liability of breakage of the cables 22 when the winding limit is reached, and to effect a shifting of the parts of the friction drive mechanism to neutral position, I provide an automatic control device for cooperation with the bar 30 and governed by the movements of the beam 9 for shifting said bar 30 at a proper time to neutral position. This device comprises a control arm 42 pivoted at its outer end, as indicated at 43, to the arm 13 of beam 9 and having at its lower end a longitudinal slot 44. This slot 44 receives a pin 45 on one arm of a bell-crank lever 46 pivotally mounted on one of the uprights 5, the upper arm of which bell-crank lever rides on the reduced portion of finger 34 of the bar 30 and is adapted for cooperation with the shoulder 45. As the arm 13 of the beam 9 is lifted in an unwinding action the slotted end 44 of the bar 42 travels upwardly and loosely on the pin 45, thus permitting the bell-crank lever 46 to have free and independent movement in maintaining contact with the finger 34, and therefore the bar 30 may be shifted back or forth as required normally in adjusting the friction gears for raising or lowering operations without interference from the bar 42 or the bell-crank lever 46. When, however, the bar 30 is shifted to bring the friction wheel 24 into driving engagement with the pulley 2 for a winding action, at which time the notched portion 36 of bar 30 will lie in rear of the locking projection 37 and the pin 45 at a point along the length of the slot 44 dependent upon beam arm 13, the parts of the control device will be disposed in position for a shifting action of bar 30 in the continuous downward movement of the arm 13 of beam 9 while the cables 22 are being wound upon the drums for a hoisting action. In this operation it will be understood that the arm 13 may be permitted to move downward as the cables 22 are wound up without disturbing the positions of the bar 30 or bell-crank lever 46, until the cables are wound and the beam arm 14 elevated to the intended maximum degree, at which time the upper end wall of slot 44 will engage the pin 45 of the bell-crank lever 46 and any further winding motion of the drums and descent of beam arm 13 beyond the safety point will result in the bell-crank lever 46 being actuated by the bar 42 to shift the bar 30 forward to the position shown in Figure 2, whereby the friction drive gears will be adjusted to the neutral position and the notch 36 engaged with the locking projection to lock the shifter bar 30 in such position, whereby provision is made to prevent over-winding of the cables and the liability of their breakage.

From the foregoing description, taken in connection with the drawings, the construction and mode of operation of my improved lifting device will be readily understood, and it will be seen that a device of this character is provided which may be applied to any ordinary tractor for hoisting purposes and which may be conveniently controlled in its operations. Also it will be seen that by means of the friction gearing described a winding or unwinding motion of the cable drums may be obtained through simple adjustments, and through the worm gearing employed the parts will at all times be locked against any possibility of the release of the load by unwinding action of the cables while the load is in process of being lifted. Furthermore, it will be seen that simple and effective means are provided for throwing the friction gearing out of action to prevent the cables 22 from being over-stressed and broken or injured. Other advantages of the invention will be apparent to those versed in the art without a further and extended description.

Having thus fully described our invention, we claim.

1. In winding means, the combination of a supporting frame, a swinging frame mounted on the supporting frame, drums carried by the swinging frame, a transverse shaft on the swinging frame, worm gearing between said shaft and each of said drums, a primary driven gear mounted on said shaft, a swinging member supported for movement in an arc different from the arc of movement of said shaft, a secondary driven gear carried by said swinging member, and shifting means coupling said shaft and swinging member for movements in unison.

2. In winding means, the combination of a supporting frame, a swinging frame, drums carried by the swinging frame, a shaft carried by the swinging frame, worm gearing between said shaft and each of said drums, a swinging crank member, friction wheels carried by the shaft and swinging crank member, and connecting means between the shaft and crank member for shifting said friction wheels in unison relative to each other and to the drive gear.

3. In winding means, the combination of a supporting frame, a drive gear mounted on said supporting frame, a swinging frame composed of brackets mounted on the supporting frame, a shaft connecting said brackets and journaled therein, drums carried by the brackets, worm gearing between the shaft and each of said drums, a swinging frame, friction driver wheels carried by the shaft and crank, a link connection between the shaft and crank, and a shifter bar connected with the crank for swinging said shaft and crank in unison.

4. In a lifting device, the combination of a supporting frame, a lifting beam, a drive wheel mounted on the supporting frame, primary and secondary friction wheels mounted on the supporting frame and movable for directly engaging the primary friction wheel with the drive wheel for indirectly connecting said primary driven wheel with the drive wheel through said secondary driven wheel for moving said primary and secondary driven wheels to neutral position, winding means connecting the primary driven wheel with the lifting beam, a shifting bar for adjusting the primary and secondary driven wheels, a control device connected with the beam, and means governed thereby and operative at the limit of lifting movement of the lifting beam for shifting and locking said driven gears in neutral position.

5. In a lifting device, the combination of a supporting frame, a lifting beam, a drive wheel mounted on the supporting frame, primary and secondary friction wheels mounted on the supporting frame and movable for directly engaging the primary friction wheel with the drive wheel for indirectly connecting said primary driven wheel for moving said primary and secondary driven wheels to neutral position, winding means connecting the primary driven wheel with the lifting beam, a guide member having a locking element, a bar for shifting the driven gears having an end portion movable in said guide and provided with a notch to engage said locking element, a finger and a shoulder, a control bar pivoted to the lifting beam and having a slotted free end portion, and a bell-crank bar shifting member having one arm provided with a pin engaging the slotted portion of the control bar and its other arm engaging said finger and adapted for cooperation with said shoulder to shift the bar into neutral and locked position under certain conditions.

In testimony whereof we affix our signatures in presence of two witnesses.

CLYDE SALYARDS.
GEORGE B. SCHEFFEY.

Witnesses:
 CLARENCE WERTHAN,
 J. H. BOUTCHER.